April 12, 1955  R. A. GOODALL  2,706,095
FISHING REEL

Filed July 5, 1949  2 Sheets-Sheet 1

INVENTOR
ROBERT A. GOODALL,
BY Munn, Liddy & Glaccum
ATTORNEYS

April 12, 1955   R. A. GOODALL   2,706,095
FISHING REEL
Filed July 5, 1949  2 Sheets-Sheet 2
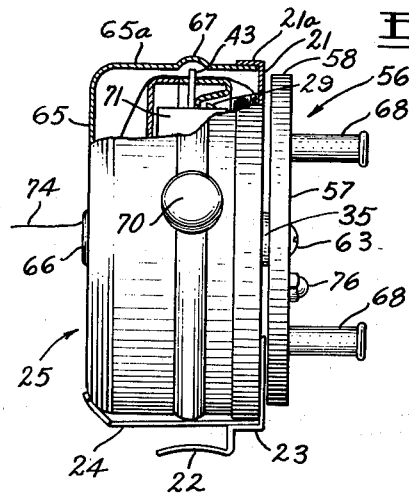
Fig. 5.
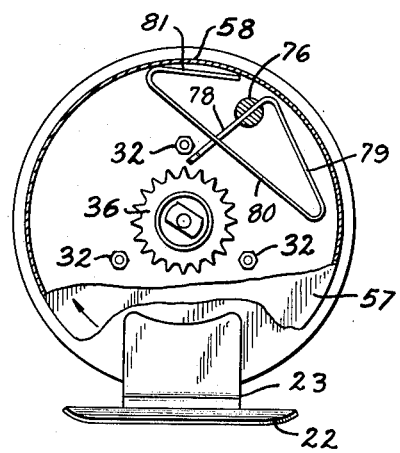
Fig. 7.
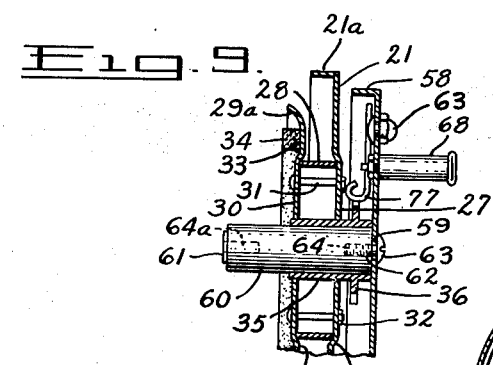
Fig. 9.
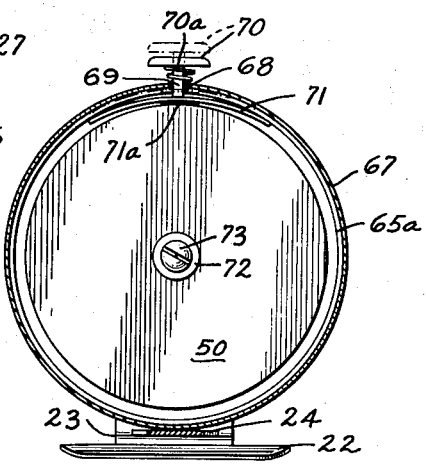
Fig. 6.
Fig. 8.
INVENTOR
ROBERT A. GOODALL,
BY Munn, Liddy & Glaccum
ATTORNEYS United States Patent Office 2,706,095
Patented Apr. 12, 1955

2,706,095
FISHING REEL

Robert A. Goodall, Ogallala, Nebr., assignor to Good-All Electric Manufacturing Company, Inc., Ogallala, Nebr., a corporation of Nebraska Application July 5, 1949, Serial No. 103,149

16 Claims. (Cl. 242—84.6)

This invention relates to fishing reels and more particularly to a reel of the spinner type wherein the reel drum or spool is held stationary and the line is picked up by means of a traveling finger and wound around the drum. For casting the finger is moved out of position and the line itself unwinds off the drum.

An object of the present invention is to provide a novel fishing reel wherein the mechanism of the reel is controlled by the forward or reverse movement of the winding handle, wherein the forward movement picks up the line and winds it on the spool, and the reverse movement, by means of a lost motion or delayed action mechanism, automatically moves the finger out of the way of the line allowing free unwinding.

Another object is the provision of a fishing reel wherein a cam surface is interposed between the handle and traveling finger to permit said handle to be moved in reverse one-third to one-half turn before the finger is moved out of the way of the line. If, when the finger is in a withdrawn position, the handle is moved forwardly one-third to one-half turn the cam surface contacts the finger and moves it into a line contacting position.

Still another object of the invention is the provision of a reel having a winding drum or spool which is narrow and deep thereby accommodating as much line as the ordinary reel and since the spool is narrow the line will automatically fall into position thereon and will not be inclined to entangle itself.

A further object of this invention is to provide a fishing reel with a cover thereon, said cover having a circumferential groove or rib therein so located as to receive the finger when in its extended position, allowing the finger to always pick up the line when in this position.

Still other objects and advantages will become apparent from the following description of the present invention illustrated in the accompanying drawings in which:

Figure 5 is an assembled side elevation of the form of the invention shown in Fig. 1 with a part of the casing broken away;

Figure 6 is a view of the reel of my invention showing the cover in section to disclose the operation of the line holding means;

Figure 7 is a view of the clicker mechanism partly broken away to disclose the operation thereof;

Figure 8 is a view similar to Fig. 7 except that the clicker assembly is rotating in the opposite direction; and Figure 9 is a view of the winding mechanism, some of the parts being broken away.

Similar reference characters represent similar parts in the several figures.

Figure 1:
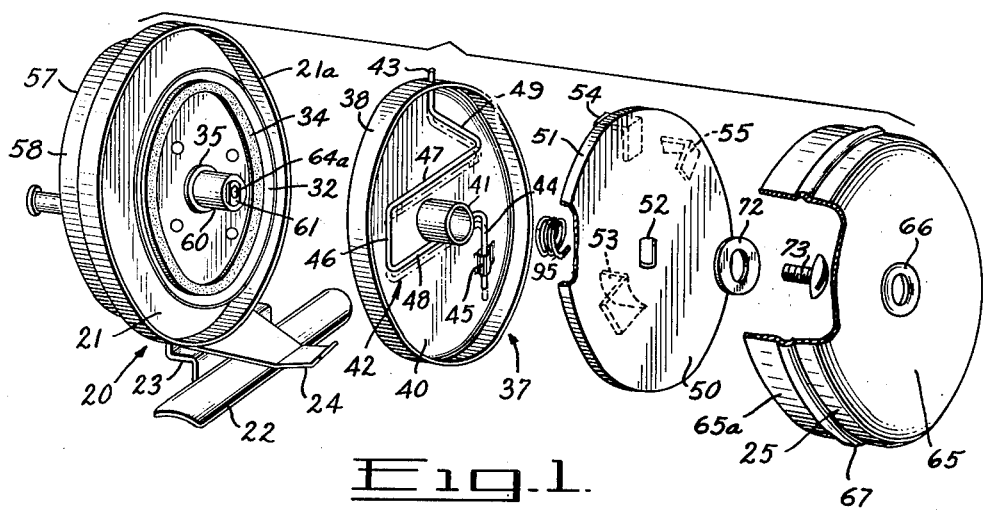
Figure 1 is an exploded perspective view of the preferred form of the invention.
Figures 2, 3:
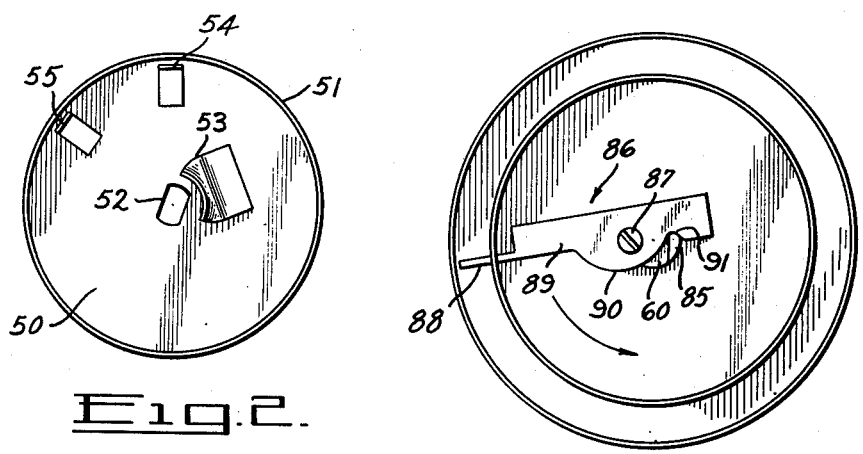
Figure 2 is an elevational view showing the inside of the cam disc of Fig. 1.
Figure 3 is an elevation of a modified form of the invention showing the finger in a line engaging position and turning in a direction to wind the line on the spool.

In the preferred form of the invention shown in Figs. 1, 2 and 5 the reel comprises a main stationary body portion 20 which includes a disc 21 having a peripheral flange 21ª thereon and secured to the lower end of said disc is the usual foot 22 by which the reel is attached to the fishing rod. It will be noted from Fig. 1 that a step like plate 23 is used to connect the foot 22 to disc 21. It is this plate which places the foot in a laterally spaced position from the disc and in a more centrally arranged position on the reel. Also connected to the disc 21 is a spring clip 24 which is adapted to hold the cup-shaped reel cover or housing 25 in place, a detailed disclosure of which will be made as the description proceeds.

As seen in Fig. 9, the central portion of flanged disc 21 is recessed as at 26 thereby forming a surface 27 parallel to the disc surface but not in the same plane therewith. This recessed surface 27 is circular and is adapted to receive adjacent the periphery thereof one end of a sleeve-like spool or winding drum 28. Abutting the other end of spool 28 is a brake disc 29, having a circular recessed surface 30, similar to surface 27 on disc 21, of a diameter which allows the spool 28 to be received thereby. A set of three apertures are provided in surfaces 27 and 30 in axial alignment with each other. Adapted to be received by said apertures are small bolts 31 having nuts 32 to secure the brake disc 29 and flanged disc 21 together.

The outer peripheral portion of brake disc 29 is provided with a curved flange 29ª which extends at an angle of approximately 135° relative to the disc surface. Intermediate this outer peripheral flange and the periphery of the circular recessed surface 30 a seating 33 is formed whereby a circular leather washer 34 may be received therein.

The central portion of flanged disc 21 is furnished with an aperture which receives a circular sleeve or bushing 35 therein. The usual method of securing bushing 35 to the disc is to press-fit it therein. This bushing is of a length to extend beyond the inner and outer faces of the disc. Adjacent the outer face of disc 21 and spaced from the recessed surface 27 a toothed wheel 36 is secured by means of a press-fit to bushing 35. The opposite end of said bushing is received by an aperture in the central portion of brake disc 29 and extends a short distance beyond said disc.

As seen in Figs. 1 and 5 a friction disc or drive element generally designated as 37 is employed adjacent the brake disc 29. Disc 37 comprises an outer peripheral wall portion or rim 38 which extends longitudinally of the reel. One end of said rim is formed into a downwardly and inwardly turned flange which terminates at the outer periphery of a flat circular surface 40. By this construction a recess is formed which is adapted to receive therein the brake disc flange 29ª. The central portion of the flat circular surface 40 is apertured to receive a stud line sleeve 41 which projects outwardly beyond the free end of rim 38. The brake disc is furnished with a movable finger 42 made from a length of stiff wire. As will be seen from Figs. 1 and 5, the finger comprises a line contacting end portion forming a line pick-up element or flyer 43 which is adapted to be slidably received in an aperture in the peripheral rim 38. The other end portion of finger 42 designated as 44, is adapted to be slidably received in a sleeve 45 which may be stamped out of disc surface 40 or may be a separate part secured to the disc surface. Intermediate end portions 43 and 44 the finger is formed into a U-shaped portion having a base 46 and parallel arms 47 and 48, the arms being adjacent and integral with end portions 43 and 44, respectively. It is to be noted that finger 42 is intended to lie flat on the disc surface 40 and to slide relative thereto. To this end arm 47 of the U-shaped portion of the finger is of a greater length than arm 48 providing an extension 49. Were it not for this extension the U-shaped portion of the finger would ordinarily pivot, on its end portions, out of parallelism with disc surface 40. However, extension 49 prevents such pivotal movement since it extends beyond the pivoting axes of the finger. The amount of sliding movement of the finger relative to surface 40 is determined by the difference in the distance between parallel arms 47 and 48, and the outer diameter of sleeve 41. The finger is so constructed and arranged that the line contacting end portion 43 may extend outwardly from rim 38 a sufficient distance to contact the line. In this position arm 48 abuts sleeve 41. When that portion 43 is withdrawn from its line contacting position, the free end of said portion terminates adjacent the outer surface of rim 38. To prevent the portion 43 from being completely withdrawn from the apertured rim, arm 47 abuts sleeve 41. These two positions of the finger are shown in Fig. 1 in solid and dotted lines, respectively.

It is to be desired to selectively place the finger in the two above-mentioned positions and to this end a cam disc 50 is employed. A coil spring 95 is positioned on shaft 60 and is adapted to abut disc 50 and the free end of sleeve 41, thereby urging disc surface 40 into contact with washer 34. The outer periphery of disc 50 is formed with a flange 51 projecting at right angles relative to the disc. Centrally of the disc an axial opening 52 is provided. The particular shape of the opening and the use thereof will be explained as the description proceeds. On the inner surface of the disc and adjacent opening 52 is employed an arcuate cam 53 which projects from the disc surface in the same direction as flange 51. It is this cam which is adapted to actuate the finger 42 when the cam disc and friction disc are placed adjacent each other in their assembled relation. Also provided is a pair of axially extending projections 54 and 55. These latter projections are placed in a spaced relation inwardly of and adjacent flange 51, although spaced therefrom.

The hand winding means generally designated as 56 comprises a disc 57 having a flange 58 projecting at right angles to the disc and around the periphery thereof. A pair of handles 68 are swivelly mounted on the face portion of disc surface 57 to facilitate the turning of disc 56. Centrally of the disc an opening 59 is provided which is similar to opening 52 in the cam disc 50. An elongated shaft or axle 60 is furnished and is adapted to be connected to disc 57. Each end of shaft 60 is provided with a boss 61 and 62, respectively, which projects longitudinally of the shaft and is smaller in size than the shaft. These bosses are comprised of four sides, two of said sides being parallel and the other two being arcuate and concentric, as seen in Figs. 1, 7 and 8. Each end of shaft 60 has an internally threaded screw receiving means 64 and 64a respectively, therein. To assemble shaft 60 and the winding disc 56 it is but necessary to place boss 62 in the disc opening 59 and to secure the same therein by inserting a screw 63 in the internally threaded screw receiving means 64 until the connection is rigid. It is to be noted that the use of boss 62 and the similar shaped opening 59 provides a locked connecting means whereby no relative movement exists between disc 56 and shaft 60.

Also mounted on disc 56 is a novel form of automatic clicker mechanism. By way of explanation of the term automatic it is first necessary to understand that on the ordinary reel winding drum the clicker makes its characteristic sound when the drum is rotated in either direction. A button is customarily utilized with the clicking mechanism so that at the will of the operator the sound may be dispensed with. Since the object of a clicker is to indicate to the operator when a fish is on the line, it is desirable that the clicker operate only when the fish strikes the line. An audible sound at any other time by the clicker gives rise to annoyment of the operator. In the present device, the clicker mechanism is automatic in that the operator only hears the noise when the fish strikes, thereby causing the reel to turn in reverse. Upon winding in the line the clicker is automatically thrown out of position and remains silent.

The structure of this important feature of the invention, best shown in Figs. 7, 8 and 9, comprises a clicker spring 75 which is pivotally mounted on disc surface 57. This pivotal mounting is obtained by placing a headed bolt 76 through an aperture in the disc and connecting an arm of spring clicker 75 to the end of bolt 76 opposite the head. The swivelling action of bolt 76 in the aperture in disc 57 provides pivotal movement for the spring.

Clicker 75 is formhed most generally from a length of spring wire, although other materials may be used. The method of constructing this member is to form a small loop 77 in one end of the length of wire. Adjacent this loop an arm portion 78 is formed by bending the rest of the length of wire approximately 70° relative thereto forming a leg. Then the remaining length of wire is bent approximately 20° relative to leg 79 forming a cross arm 80 which is generally perpendicular to arm 78 and lies adjacent thereto. The end of the wire is then bent approximately 20° relative to cross arm 80 forming an arm 81. It is one end of arm 78 which is connected to bolt 76 which affords the spring clicker 75 to be pivotally connected to disc surface 57. The clicker operates between two general positions. One of these positions is when the winding disc is being rotated in a clockwise direction, which means that the spring clicker moves likewise. When loop 77 is moved it tends to rise up over the wheel teeth, causing the whole clicker to pivot forcing arm 81 to abut the winding disc flange 58, as seen in Fig. 7, and the loop is thrown out of engagement with the stationary toothed wheel. The relation between arm 78 and the toothed wheel is a tangential one and it will be seen that in any continued clockwise rotation the teeth and arm are not in effectual contact. However, upon reversing the direction of rotation of the winding disc loop 77 contacts the toothed wheel, pivots the clicker until leg 79 is in contact with the winding disc flange 58, as seen in Fig. 8. It is to be noted that arm 78 is now in radial alignment with the axis of rotation of the disc. Any further rotation causes arm 78 to rise over the teeth on wheel 36 and to cause additional force to be applied to leg 79 and flange 58, thereby building up a potential force in arm 78 and leg 79 so that when loop 77 rises over a tooth it will spring back into its original radially aligned position and in doing so strikes an adjacent tooth. In so striking this tooth with the amount of force that has been built up in the spring, the clicking noise is created and is further amplified by being carried through arm 78 and leg 79 to winding disc flange 58.

The cup-shaped reel housing 25 comprises a relatively flat circular base portion 65 having an aperture centrally thereof with an eye 66 secured therein. This eye 66, as seen in Fig. 1 is the means allowing the entrance of the line into the winding spool. Adjacent the outer periphery of the housing base portion 65, a rim or wall portion 65a extends therefrom at right angles to the base 65. An internally hollow rib 67 is provided in rim 65a and extends completely therearound, the rib having an aperture 68 therein.

A thumb type line stopping assembly is mounted on the housing wall 65a. This assembly comprises a pin 69 which is adapted to extend through aperture 68 and to be slidably received therein. The outer end of the pin has mounted thereon a thumb button 70. Soldered on the other end of pin 69 is an elongated, flat, sheet spring 71. Immediately below the sheet spring a circular boss 71a is soldered to the end of pin 69. The thickness of boss 71a is approximately that of the line to be used. A coil spring 70a is interposed between thumb button 70 and the housing rim 65a normally holding the button and sheet spring in the dotted line positions of Fig. 6. It is to be noted that the ends of the sheet spring 71 are always in contact with the inner surface of rim 65a.

From the foregoing detailed description of the reel, the following steps in the assembly and method of operation will be understood. Beginning with the stationary body 20 of the reel it is first necessary to place shaft 60 in sleeve 35, as seen in Fig. 9, and extend the shaft therethrough until the surface of winding disc 56 abuts one end of the sleeve. The winding disc and its associated shaft is now rotatably mounted relative to body 20, the shaft extending outwardly beyond the sleeve. Washer 34 is then placed against disc 29 in the seat 33 formed therein. It is to be noted that washer 34 is of a thickness that allows the outer surface thereof to extend slightly beyond the plane of the outer periphery of flange 32 on disc 29.

The next step involves the rotatable mounting of friction disc 37 on shaft 60. This is performed by placing sleeve 41 on said shaft and allowing the surface 40 of the disc to abut the washer. In this manner there is no metal to metal contact between discs 37 and 29. It will be seen from Fig. 5 that the overhanging portion 39 of rim 38 on the friction disc 37 overlies flange 32 on disc 29. Spring 95 is then mounted on shaft 60.

The cam disc 50 is then placed adjacent friction disc 37, boss 61 being received by the opening 52. It will be seen that because of the particular shape of the boss and opening that no rotating relative movement can exist therebetween. Boss 61 is of a length so as to extend slightly beyond the outer face of disc 50 so that a washer 72 may be received thereby. A screw threaded bolt is then placed in the internally threaded opening 64a in shaft 60 and secured therein thereby holding the assembly together. The housing 25 is then placed within flange 21a on body disc 21 and is held therein by the spring clip 24.

From Fig. 1 it will be apparent that the cam surface 53 is to be placed within the U-shaped portion of the moving finger 42 adjacent the base 46. Therefore when the cam disc rotates relative to the friction disc, the cam will strike either arm 47 or 48 of the finger depending on the direction of rotation. In striking these arms the finger end portion 43 is moved into and out of line engaging position.

To reconstruct the relative movements of the various discs, the body portion 20 is always stationary. The winding disc 56 is rotatable in the stationary body and is always capable of such rotating movement. In other words, it is never locked in a definite position. Disc 37 is rotatably mounted on shaft 60. Since the cam disc 50 is rigidly connected to one end of the shaft and is especially equipped with means to prevent relative movement therebetween, this disc always rotates in unison with the winding disc. It is this disc 50 and the stops 54 and 55 thereon that determines the rotative relative movement of disc 37. That is, as the winding disc and cam disc rotate in one direction a sufficient amount for one of the stops to engage the end portion 43 of finger 42 and the rotation is continued, disc 37 then begins to rotate with discs 56 and 50. Conversely, when the direction of rotation is changed disc 50 rotates relative to disc 37 until the other stop engages end portion 43 and causes it to rotate with disc 50. Since these stops are positioned approximately 60° apart relative to the center of the disc it will be seen therefore that disc 50 may move in either direction approximately 300° before a stop engages the finger and causes the two discs to rotate in unison. This provides a sort of lost-motion connection between discs 37 and 50. It is during this lost-motion period that cam 53 engages arms 47 or 48 and places the end portion 43 of finger 42 into, or out of, line engaging position. Therefore by the time the lost-motion has ceased to exist the end portion 43 has been completely extended or withdrawn. It is to be noted that spring 95 urges disc 40 against washer 34, thereby preventing disc 40 from rotating with the cam disc except when the stops on the cam engage the finger.

A line 74 is then attached to the spool 28 led over the periphery of discs 37 and 50 and through eye 66 in housing 25, as seen in Fig. 5. As heretofore explained in the present type of reel the line is allowed to unwind from spool 28 around the periphery of discs 37 and 50, that is, in unwinding the line is continually traversing the periphery of the discs. As a means for controlling the unwinding of line 74 the thumb button comes into use. By pressing button 70 into the solid line position shown in Fig. 6 it will be seen that boss 71a engages the periphery of the discs while the end portions of sheet spring 71 ride against the housing rim. Therefore as the line is traversing the periphery of the discs in unwinding it comes to rest against boss 71a and is not allowed to unwind further. The sheet spring acts as a guide means for drawing the line into engagement with the boss.

The casting operation is the logical beginning step in explaining the reel's action. As has already been recited to withdraw the finger end portion 43 from its line contacting position it is but necessary to turn the winding disc about 300° in reverse. If discs 37 and 50 are assembled in the same relation as seen in Fig. 1, to withdraw the pin it would be necessary to rotate disc 50 relative to disc 37 until cam 53 had rotated past arm 47 and on around the disc until it engages the upper end of arm 48 adjacent end portion 49. By further rotation the cam actuates arm 48 and withdraws the end portion 43. Upon further rotation stop 35 engages end portion 43 and from that time on the two discs will rotate together.

When the line contacting end portion of the finger is withdrawn the line will unwind and is free to do so while casting. However, just before casting it is desirable to hold the line and any lure thereon from free movement. This is accomplished by thumb button 70. At the instant the lure is cast the thumb button is released and the line will unwind from spool 28. When the lure strikes the surface of the water the unwinding of the line ceases immediately.

To reel in the line the winding disc is rotated forwardly or clockwise (as viewed from the handle side of the reel) and the following takes place. For the first 300° of disc rotation cam surface 53 comes past arm 48 of finger 42 and strikes arm 47 forcing end portion 43 up into line contacting position. At the end of 300° stop 54 is contacting end portion 43 and the two drums, 37 and 50, rotate in unison. Line 74 is picked up by end portion 43 and as discs 56, 37 and 50 rotate in unison line 74 is wound on the spool.

Figure 4:
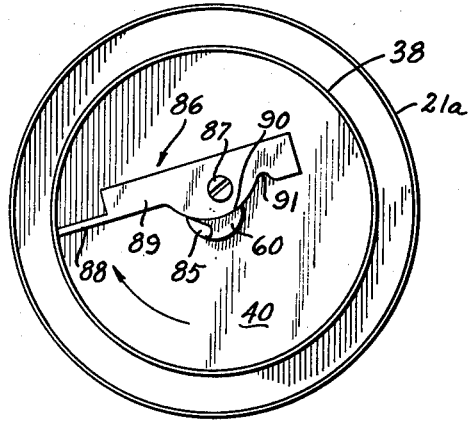
Figure 4 is a view similar to Fig. 3 excepting that the line engaging finger is withdrawn and the rotation of the drum and finger is in the opposite direction.

In the modified form of the invention shown in Figs. 3 and 4 the same function of the line contacting finger is utilized except that in the modified reel a different finger and eccentric mounting arrangement is used. A projection, designated as 85, is formed on the end of shaft 60 in lieu of the boss 61 which was used in the preferred form of the invention. This projection 85 extends outwardly beyond the end portion of shaft 60 the approximate thickness of the line contacting finger, generally designated as 86. It is to be noted that projection 85 is placed adjacent the outer periphery of shaft 60. Also finger 86 is eccentrically mounted on shaft 60 by means of a screw 87. The finger 86 comprises a line contacting end portion 88 and a body portion 89. One side of the body portion is generally straight, while the other side thereof is arcuate in shape. This arcuate shaped portion, designated as 90, extends between the finger and shaft connecting means 87 and projection 85. Also formed in the body portion adjacent the arcuate shaped portion is a recess 91 which is adapted to receive one side of projection 85 therein when in the position shown in Fig. 3.

In this preferred form of the invention the action of the fisherman is exactly the same as in the preferred form of the invention except in the instant case only about 60° rotation of the winding disc is necessary to place the end portion 88 into or out of line contacting position. Beginning with the position of the finger 86 shown in Fig. 3 wherein the end portion 88 is in line contacting position the reel is shown to be rotating in a winding-in direction, that is to say, the line is being wound onto the spool by means of the rotating end portion 88. Relative movement between the friction disc 37 and the winding disc 57 is prevented when such winding-in is taking place by the fact that the cam 85 rests in the recess 91 and therefore locks the two cams in a single direction drive. When it is desired to withdraw the end portion 88 from the line contacting position it is but necessary to reverse the direction of rotation of the winding drum and to rotate said drum through approximately 60° until the other side of projection 85 comes into contact with the finger arcuate portion 90 as seen in Fig. 4, thereby locking the two drums for rotation in a single direction. When in this position the line is allowed to unwind from spool 28 in the same manner as in the preferred form of the invention.

It will be seen that the entire mechanism of the reel is controlled in the forward and reverse movement of the winding disc, wherein, the forward movement picks up the line and winds it on the spool, and the reverse movement, by means of the delayed action or lost motion, automatically moves the finger out of the way and the line unwinds. It is to be noted that in the two forms of the invention the delayed action between the winding disc and the friction disc permits the handle to be moved backwards or forwards 300° in one case and 60° in the other, and because of this provides a definite advantage, this advantage being that accidental removal of the finger from line-engaging position when having a fish on the line, or when getting ready to cast is prevented. It has been further shown that the reel possesses a particularly novel clicker mechanism which possesses many advantages heretofore unknown in the art. Also a particularly important feature is the groove 67 which allows the line contacting end portions of the moving fingers to project therein thereby preventing line 74 from jumping over the top of said end portions.

Of further importance is the novel line contacting thumb button which makes it possible to have absolute control of the line prior to casting and releasing the line. This possesses advantages over the ordinary procedure of holding the thumb on the rotary reel. A further use of this button permits accurate stopping of the lure at any desired point during the casting operation. This button also permits the operator to hold the line when a fish is on the other end thereof, thus providing a method of holding the fish during the complete reeling in operation.

This reel further possesses inherent advantages in construction. It will be noticed that the several parts of the reel can be made with the same dies, and duplicate parts may be used for accomplishing various purposes, thus reducing greatly the cost of manufacture by using the same parts in many positions. It will be seen that also inherent in this reel is the fact that there is never any line tangling as in the ordinary reel because there is no rotating part that possesses rotating momentum at the time the lure strikes the water. This feature alone provides greater satisfaction and efficiency in operation.

It will be seen that I have provided a low cost neat appearing reel, of small design which is simple in operation, free from expensive types of construction providing freedom of service, and designed in a very simple manner. This latter point is evident from the fact that all basic parts are of the circular or disc type which can be stamped from metal instead of being made by machines, many of the stampings being of the same size.

While a preferred form of the invention has been shown and described it will be understood that variation in details of form may be made witthout departure from the invention as defined in the appended claims.

I claim:

1. A fishing reel comprising a housing including a stationary spool adapted to have a line wound therearound, a shaft rotatably mounted in said housing and having a portion thereof extending through the wall of the housing, means exterior of the housing for rotating the shaft, a disc-like element rotatably mounted on the shaft adjacent said stationary spool, friction means located between said element and spool, a peripheral flange on said element, said flange being of greater diameter than the adjacent side of the spool and telescopically overlapping substantially one-half of the spool, said peripheral flange having an aperture therein, a line pick-up finger movably attached to the face of said disc-like element remote from said spool, a plate member rigidly secured to the inner end of said rotatable shaft and having a cam on its face adjacent said disk-like element, said cam being movable on rotation of the shaft in one direction to engage said finger to extend the finger outwardly through said aperture and to withdraw said finger from its extended position upon rotation in the other direction, and a spring located between the plate and disc-like element urging the element into contact with said friction means whereby initial rotation of the shaft causes radial movement of the finger and continued rotation of the shaft causes rotation of the disc-like element.

2. A fishing reel comprising a housing including a stationary spool adapted to have a line wound therearound, a shaft rotatably mounted in said housing and having a portion thereof extending through the wall of the housing, means exterior of the housing for rotating the shaft, a disc-like element rotatably mounted on the shaft adjacent said stationary spool, a peripheral flange on said element, said flange being of greater diameter than the adjacent side of the spool and telescopically overlapping substantially one-half of the spool in an axial direction, said peripheral flange having an aperture therein, a finger slidably received in said aperture, and means extending said finger outwardly beyond said aperture when the shaft is rotated in one direction and withdrawing said finger upon rotation in the other direction.

3. A fishing reel comprising a spool adapted to have a line wound therearound, a shaft rotatably mounted relatively to said spool, means for rotating the shaft, a disc-like element rotatably mounted on the shaft adjacent said spool and having a peripheral flange, friction means located between said element and spool, said peripheral flange having an aperture therein, a line pick-up finger movably attached to the face of said disc-like element, a plate member rigidly secured to the inner end of said rotatable shaft and having a cam on its face adjacent said disk-like element, said cam being movable on rotation of the shaft in one direction to engage said finger to extend the finger outwardly through said aperture and to withdraw said finger from its extended position upon rotation in the other direction, a spring located between the plate and disc-like element urging the element into contact with said friction means whereby initial rotation of the shaft causes radial movement of the finger and continued rotation of the shaft causes rotation of the disc-like element.

4. A fishing reel comprising a spool adapted to have a line wound therearound, a shaft rotatably mounted relatively to said spool, means for rotating the shaft, a disc-like element rotatably mounted on the shaft adjacent said spool and having a peripheral flange, said peripheral flange having an aperture therein, a finger slidably received in said aperture, and means including cooperating elements on said shaft and disc-like element for extending said finger outwardly beyond said aperture when the shaft is rotated in one direction and withdrawing said finger upon rotation in the other direction.

5. A fishing reel comprising a spool adapted to have a line wound therearound, a shaft rotatably mounted relatively to said spool, means for rotating the shaft, a disc-like element rotatably mounted on the shaft adjacent said spool, a peripheral flange on said element, said flange being of greater diameter than the adjacent side of the spool and telescopically overlapping substantially one-half of the spool, said peripheral flange having an aperture therein, and a finger pivotally and eccentrically mounted on said shaft and having an end portion extending into said aperture so that rotation of the shaft in one direction extends said end portion outwardly beyond said aperture and rotation in the other direction withdraws said end portion from its extended position.

6. A fishing reel comprising a spool, a line guide, means mounting said line guide in a position spaced from and axially aligned with said spool, a drive shaft extending through said spool, means for rotating said shaft, a drive element mounted on said shaft and between said line guide and said spool and having an opening, a line pick-up element mounted for projection radially through said opening into and retraction out of position to engage a line extending between said line guide and said spool and having a driving connection with said drive element for rotation thereby, means yieldably restraining rotation of said drive element, means actuated by rotational movement of said shaft in one direction relatively to said drive element for projecting and in the reverse direction for retracting said pick-up element, and means engageable upon continued rotational movement of said shaft in either direction for positively driving said drive element.

7. A fishing reel comprising a spool, a line guide, means mounting said line guide in a position spaced from and axially aligned with said spool, a drive shaft extending through said spool, means for rotating said shaft, a drive element mounted on said shaft and between said line guide and said spool and having a generally circular peripheral wall portion formed with an opening, a line pick-up element mounted for projection in a radial direction through said opening into and retraction out of position to engage a line extending between said line guide and said spool and having a driving connection with said drive element for rotation thereby, means yieldably restraining rotation of said drive element, means actuated by rotational movement of said shaft in one direction relatively to said drive element for projecting and in the reverse direction for retracting said pick-up element, and means engageable upon continued rotational movement of said shaft in either direction for positively driving said drive element.

8. A fishing reel comprising a spool, a line guide, means mounting said guide line in a position spaced from and axially aligned with said spool, a drive shaft extending through said spool, means for rotating said shaft, a drive element mounted on said shaft and between said line guide and said spool and having a generally circular peripheral wall portion formed with an opening, a line pick-up element mounted for projection in a radial direction through said wall portion into and retraction out of position to engage a line extending between said line guide and said spool and having a driving connection with said drive element for rotation thereby, a casing member having an end wall carrying said line guide and a generally cylindrical side wall disposed radially outwardly of said spool and drive element and having the portion thereof radially outwardly of said pick-up element of greater diameter than the portion nearer to said guide element, means yieldably restraining rotation of said drive element, means actuated by rotational movement of said shaft in one direction relatively to said drive element for projecting and in the reverse direction for retracting said pick-up element, and means engageable upon continued rotational movement of said shaft in either direction for positively driving said drive element.

9. A fishing reel comprising a spool including a drum, a line guide, means mounting said line guide in a position spaced from and axially aligned with said spool, a drive shaft extending through said spool, means for rotating said shaft, a drive element mounted on said shaft and between said line guide and said spool and having a peripheral wall extending telescopingly over said drum in an axial direction, said wall having an opening therethrough, a line pick-up element mounted for projection through said opening into and retraction out of position to engage a line extending between said line guide and said spool and having a driving connection with said drive element for rotation thereby, means yieldably restraining rotation of said drive element, means actuated by rotational movement of said shaft in one direction relatively to said drive element for projecting and in the reverse direction for retracting said pick-up element, and means engageable upon continued rotational movement of said shaft in either direction for positively driving said drive element.

10. A fishing reel comprising a spool, a line guide, means mounting said line guide in a position spaced from and axially aligned with said spool, a drive shaft extending through said spool, means for rotating said shaft, a drive element mounted on said shaft and between said line guide and said spool and having an opening, a line pick-up element disposed for projection radially through said opening into and retraction out of position to engage a line extending between said line guide and said spool, means yieldably restraining rotation of said drive element, means pivotally connecting said pick-up element eccentrically to said shaft whereby rotational movement of said shaft in one direction relatively to said drive element projects and in the reverse direction retracts said pick-up element, and means engageable upon continued rotational movement of said shaft in either direction for positively driving said drive element.

11. A fishing reel comprising a spool, a line guide, means mounting said line guide in a position spaced from and axially aligned with said spool, a drive shaft extending through said spool, a drive element mounted on said shaft and between said line guide and said spool, a line pick-up element mounted for projection into and retraction out of position to engage a line extending between said line guide and said spool and having a driving connection with said drive element for rotation thereby and spaced parallel surfaces on either side of the axis of said drive element, means yieldably restraining rotation of said drive element, means including a cam driven by said shaft in one direction relatively to said drive element to engage one of said surfaces for projecting and in the reverse direction to engage the other of said surfaces for retracting said pick-up element, and means engageable upon continued rotational movement of said shaft in either direction for positively driving said drive element.

12. A fishing reel comprising a spool, a line guide, means mounting said line guide in a position spaced from and axially aligned with said spool, a drive shaft extending through said spool, a generally cup-shaped drive element mounted on said shaft and between said line guide and said spool and having an opening, a line pick-up finger mounted within said drive element for projection radially through said opening into and retraction out of position to engage a line extending between said line guide and said spool and having a driving connection with said drive element for rotation thereby, means yieldably restraining rotation of said drive element, means actuated by rotational movement of said shaft in one direction relatively to said drive element for projecting and in the reverse direction for retracting said pick-up finger, means engageable upon continued rotational movement of said shaft in either direction for positively driving said drive element, said drive element serving at least in part for inclosing said pick-up finger except the extreme tip thereof and said projecting and retracting means.

13. A fishing reel comprising a spool, a casing member having a line guide spaced from and axially aligned with said spool, a drive shaft extending through said spool, a cupped drive element having a circular end wall and a peripheral side wall formed with an opening, said drive element being mounted on said shaft and between said line guide and said spool and positioned to guide a line onto said spool, a line pick-up element slidably mounted on the end wall of said drive element for projection through said opening into and retraction out of position to engage a line extending between said line guide and said spool and having a driving connection with said drive element for rotation thereby, friction means yieldably restraining rotation of said drive element, means including a cam mechanism actuated by rotational movement of said shaft in one direction relatively to said drive element for projecting and in the reverse direction for retracting said pick-up element, and means including abutments on said shaft and said drive element engageable upon continued rotational movement of said shaft in either direction for positively driving said drive element.

14. A fishing reel comprising a spool, a line guide, means mounting said line guide in a position spaced from and axially aligned with said spool, a drive shaft extending through said spool, a drive assembly including a drive element mounted on said shaft and between said line guide and said spool and a line pick-up element mounted for projection radially into and retraction out of position to engage a line extending between said line guide and said spool and having a driving connection with said drive element for rotation thereby, friction means yieldably restraining rotation of said drive element, means including cam elements on said pick-up element and on said shaft respectively and actuated by rotational movement of said shaft in one direction relatively to said drive element for projecting and in the reverse direction for retracting said pick-up element, and means including abutments on said shaft and said drive assembly respectively and engageable upon continued rotational movement of said shaft in either direction for positively driving said drive assembly.

15. A fishing reel comprising a spool, a line guide, means mounting said line guide in a position spaced from and axially aligned with said spool, a drive shaft extending through said spool, means for rotating said shaft, a drive element mounted on said shaft and between said line guide and said spool, a line pick-up element mounted for projection in a substantially radial direction into and retraction out of position to engage a line extending between said line guide and said spool and having a driving connection with said drive element for rotation thereby, means yieldably restraining rotation of said drive element, means actuated by rotational movement of said shaft in one direction relatively to said drive element for projecting and in the reverse direction for retracting said line pick-up element, and means engageable upon continued rotational movement of said shaft in either direction for positively driving said drive element.

16. A fishing reel comprising a stationary spool, a line guide, means including a casing mounting said line guide in a position spaced from and axially aligned with said spool, a drive shaft extending through said spool, a drive assembly including a peripherally flanged disc rotatably mounted on said shaft and between said line guide and said spool with the flange overhanging said spool, and a pick-up element slidably mounted on said disc for projection radially through the flange of said disc into and retraction out of position to engage a line extending between said line guide and said spool and having a driving connection with said disc for rotation thereby, friction means between said spool and said disc yieldably restraining rotation of said disc, a member carried by said shaft and rotatable therewith, a cam element on said member engageable with said pick-up element and actuated by rotational movement of said shaft in one direction relatively to said disc for projecting and in the reverse direction for retracting said pick-up element, and spaced abutments on said member engageable respectively with said drive assembly and upon continued rotational movement of said shaft in either direction for positively driving said drive assembly.

References Cited in the file of this patent

UNITED STATES PATENTS

| | | |
|---|---|---|
| 843,514 | Baumgartel | Feb. 5, 1907 |
| 996,348 | Kramer | June 27, 1911 |
| 1,114,084 | Wells | Oct. 20, 1914 |
| 1,204,856 | From | Nov. 14, 1916 |
| 1,807,199 | Dear | May 26, 1931 |
| 1,996,697 | Cumings | Apr. 2, 1935 |
| 2,034,917 | Miller | Mar. 24, 1936 |
| 2,059,765 | Adams | Nov. 3, 1936 |
| 2,492,587 | Ledingham | Dec. 27, 1949 |
| 2,507,457 | Rix | May 9, 1950 |
| 2,521,543 | Shakespeare et al. | Sept. 5, 1950 |
| 2,546,559 | Nix | Mar. 27, 1951 |

FOREIGN PATENTS

| | | |
|---|---|---|
| 22,597 | Great Britain of 1907 | June 11, 1908 |
| 904,699 | France | Mar. 12, 1945 |